(No Model.)
J. J. McCARTHY.
HAME.
No. 520,071. Patented May 22, 1894.
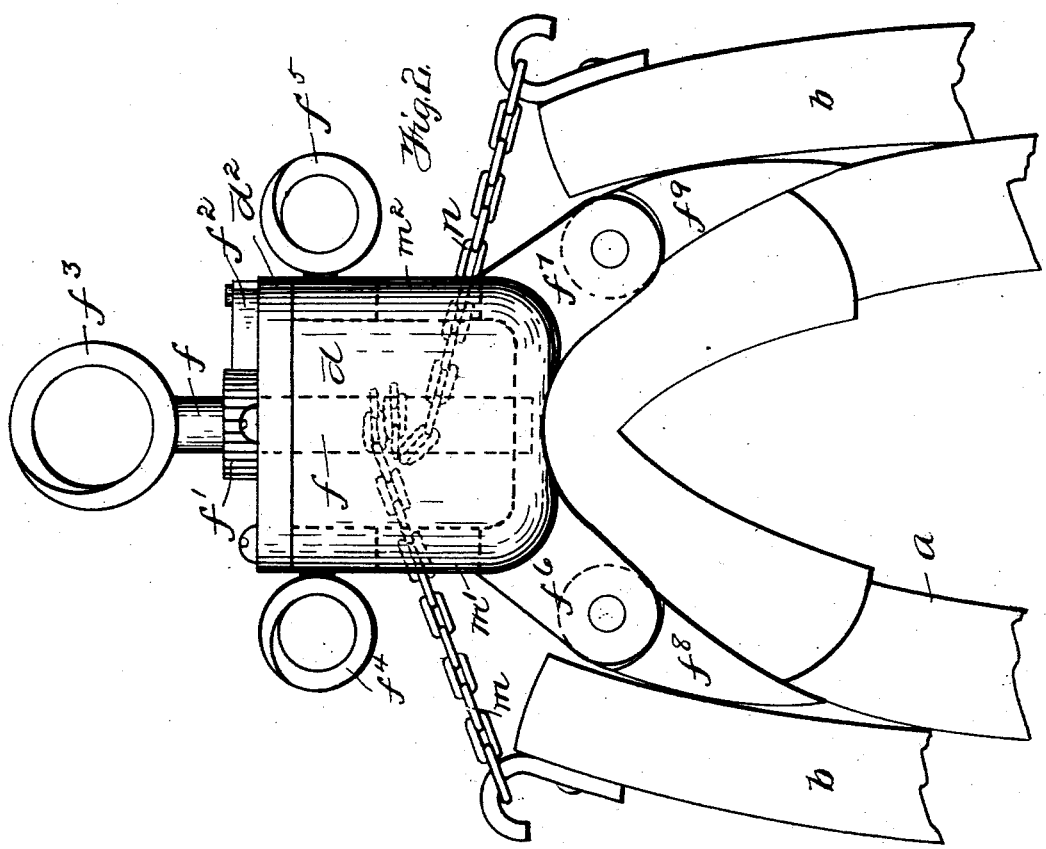
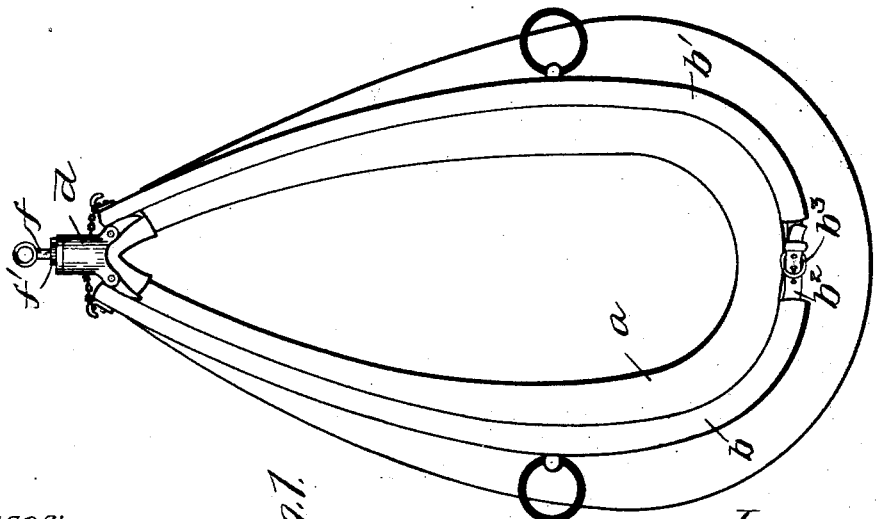
Witnesses:
Inventor,
John J. McCarthy
By his Attorney.

UNITED STATES PATENT OFFICE.

JOHN J. McCARTHY, OF BOSTON, ASSIGNOR OF ONE-HALF TO DENNIS McCARTHY, OF NEWTON, MASSACHUSETTS.

HAME.

SPECIFICATION forming part of Letters Patent No. 520,071, dated May 22, 1894.

Application filed May 8, 1893. Serial No. 473,370. (No model.)

*To all whom it may concern:*

Be it known that I, JOHN J. MCCARTHY, of Boston, in the county of Suffolk and State of Massachusetts, have invented Improved Hames, of which the following is a specification, reference being had to the accompanying drawings, in which—

Figure 1 is a front view of a collar and hames; Fig. 2 an enlarged view of the upper end of the hames.

The invention has for its object to provide a device for adjusting the hames readily to the collar and also for preventing the wear of the hames by the check-rein. The check rein in working harness is usually looped over the tops of the hames so that in time both the hames and rein are badly defaced; and as the ordinary devices for connecting the ends of the hames are not readily adjustable, much difficulty is experienced in fitting hames to collars of different sizes.

The collar $a$ and hames $b$ $b'$, are of well known construction the latter provided with the usual connection at their lower ends as a strap and buckle $b^2$ $b^3$.

The yoke $d$ comprises a body portion $d'$ which is hollow and has a lid $d^2$ forming the upper bearing for a spindle $f$ having a ratchet $f'$ and pawl $f^2$. The upper end of spindle $f$ can be provided with any suitable device as the ring $f^3$ for attachment of an over check, and also with two rings $f^4$ $f^5$ for a side check. The legs $f^6$ $f^7$ and pivoted extensions $f^8$ $f^9$ embrace the collar and afford a firm seat for the yoke, the extensions $f^8$ $f^9$ adapting themselves to the contour of the collar.

The upper end of the hames are hooked or otherwise engaged to the flexible connections $m$ $n$ which pass through holes $m'$ $m^2$ in the yoke and are connected to spindle $f$ as shown by dotted lines in Fig. 2.

The operation of the contrivance can readily be understood. In putting the hames on the collar the yoke is placed in position the hames then fitted to the collar, and the spindle $f$ turned to take in the slack of the connections until the hames are fitted upon the collar.

What I claim is—

1. The improved hame fastener consisting of a yoke to straddle the collar, a box on the yoke carrying a spindle, that spindle and flexible connections attached to the spindle to engage the hames, such connections being taken up and let out by turning the spindle and means for holding the spindle in adjusted position all substantially as set forth.

2. In combination a yoke provided with pivoted feet $f^8$ $f^9$ to straddle the collar, the spindle $f$ flexible connections $m$ $n$ to connect the hames with the spindle, ratchet $f'$ and pawl $f^2$ to hold spindle, all arranged to operate substantially as set forth.

3. In combination yoke $d$, extensions $f^8$ $f^9$ spindle $f$, extensions $m$ $n$, rein holding devices $f^3$ $f^4$ $f^5$ and ratchet and pawls $f'$ $f^2$ substantially as and for the purposes set forth.

JOHN J. McCARTHY.

Witnesses:
 DENNIS MCCARTHY,
 JONATHAN CILLEY.